(12) United States Patent
Matsuoka

(10) Patent No.: US 9,967,478 B2
(45) Date of Patent: May 8, 2018

(54) IMAGING DEVICE AND INFRARED IMAGE GENERATION METHOD

(71) Applicant: JVC KENWOOD Corporation, Yokohama-shi, Kanagawa (JP)

(72) Inventor: Tomohiro Matsuoka, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 167 days.

(21) Appl. No.: 14/675,857

(22) Filed: Apr. 1, 2015

(65) Prior Publication Data

US 2015/0373286 A1 Dec. 24, 2015

(30) Foreign Application Priority Data

Jun. 19, 2014 (JP) .................................. 2014-125933

(51) Int. Cl.
*G06T 7/11* (2017.01)
*G06T 7/136* (2017.01)
(Continued)

(52) U.S. Cl.
CPC ........... *H04N 5/332* (2013.01); *G06K 9/2018* (2013.01); *G06K 9/3233* (2013.01); *G06T 5/50* (2013.01);
(Continued)

(58) Field of Classification Search
CPC ............... G06K 9/2018; G06K 9/3233; G06T 2207/10048; G06T 2207/20221;
(Continued)

(56) References Cited

U.S. PATENT DOCUMENTS

| 2004/0021766 A1* | 2/2004 | Daniilidis | H04N 5/332 348/36 |
| 2006/0004275 A1* | 1/2006 | Vija | A61B 6/00 600/407 |

(Continued)

FOREIGN PATENT DOCUMENTS

JP 2009-010675 A 1/2009

OTHER PUBLICATIONS

Jingu Heo, "Fusion of Visual and Thermal Face Recognition Techniques: A Comparative Study", University of Tennesse, Thesis, Oct. 2003.*

*Primary Examiner* — Jamie Atala
*Assistant Examiner* — James Boylan
(74) *Attorney, Agent, or Firm* — Nath, Goldberg & Meyer; Jerald L. Meyer; Stanley N. Protigal

(57) ABSTRACT

A low-level region detection unit is configured to detect a low-level region from a far-infrared camera image. A transparent region detection unit is configured to detect a low-level region based on at least the near-infrared camera image, the low-level region having a predetermined level or less resulting from being a transparent region that is a region covered with a visually transparent material, within the low-level region detected by the low-level region detection unit. The image segmentation unit is configured to segment a portion of the transparent region from the near-infrared camera image. The superimposition unit is configured to superimpose the portion of the transparent region onto a position of the far-infrared camera image, which corresponds to a position of the transparent region, and generate a synthetic image.

5 Claims, 7 Drawing Sheets

(51) Int. Cl.
*G06T 7/168* (2017.01)
*G06T 7/174* (2017.01)
*G06T 5/50* (2006.01)
*H04N 5/265* (2006.01)
*H04N 5/272* (2006.01)
*H04N 5/33* (2006.01)
*H04N 5/262* (2006.01)
*G06K 9/20* (2006.01)
*G06K 9/32* (2006.01)

(52) U.S. Cl.
CPC ........... *H04N 5/265* (2013.01); *H04N 5/2628* (2013.01); *H04N 5/272* (2013.01); *G06T 2207/10048* (2013.01); *G06T 2207/20221* (2013.01)

(58) Field of Classification Search
CPC ........ G06T 5/50; H04N 5/2628; H04N 5/265; H04N 5/272; H04N 5/332
USPC ....................................................... 348/165
See application file for complete search history.

(56) References Cited

U.S. PATENT DOCUMENTS

| | | | |
|---|---|---|---|
| 2006/0086912 A1* | 4/2006 | Weir | G01N 21/8422 250/559.4 |
| 2007/0051890 A1* | 3/2007 | Pittman | G01J 4/00 250/332 |
| 2014/0112531 A1* | 4/2014 | Jung | G06K 9/6217 382/103 |
| 2016/0203602 A1* | 7/2016 | Hayashi | A61B 1/00009 382/128 |
| 2016/0284076 A1* | 9/2016 | Voros | G06T 7/0004 |

* cited by examiner

IMAGING DEVICE AND INFRARED IMAGE GENERATION METHOD

CROSS REFERENCE TO RELATED APPLICATION

This application is based upon and claims the benefit of priority under 35 U.S.C. § 119 from Japanese Patent Application No. 2014-125933, filed on Jun. 19, 2014, the entire contents of which are incorporated herein by reference.

BACKGROUND

The present disclosure relates to an imaging device and an infrared image generation method, which captures images of a scene using an infrared ray.

In Japanese Patent Laid-Open Publication No. 2009-10675, an imaging device is described, which captures images of a scene using a visible light camera and a far-infrared camera.

SUMMARY

An imaging device using a far-infrared camera can produce a thermal image that cannot be produced by a visible light camera. However, the imaging device using the far-infrared camera has the following problem:

For example, there is a fire in a building, and the inside of a window (that is, the interior of a room) has reached a high temperature due to flames. As far-infrared rays cannot be penetrated through windowpanes, the high temperature cannot be detected by a far-infrared camera.

It is an object of the embodiments to provide an imaging device and an infrared image generation method, which are capable of confirming a situation inside of a portion where a transparent substance exists, which does not allow the penetration of far-infrared rays.

A first aspect of the embodiments provides an imaging device comprising: a far-infrared camera configured to capture an image of a scene using a far-infrared ray in a first wavelength band and generate a far-infrared camera image; a near-infrared camera configured to capture an image of the scene using a near-infrared ray in a second wavelength band shorter than the first wavelength band and generate a near-infrared camera image; a low-level region detection unit configured to detect a low-level region with a predetermined level or less from the far-infrared camera image; a transparent region detection unit configured to detect a low-level region as a transparent region based on at least the near-infrared camera image, the low-level region having the predetermined level or less resulting from being a transparent region that is a region covered with a visually transparent material, within the low-level region detected by the low-level region detection unit; an image segmentation unit configured to segment a portion of the transparent region from the near-infrared camera image; and a superimposition unit configured to superimpose the portion of the transparent region onto a position of the far-infrared camera image, the position corresponding to a position of the transparent region, and generate a synthetic image.

A second aspect of the embodiments provides an infrared image generation method comprising: generating a far-infrared camera image by a far-infrared camera that captures an image of a scene using a far-infrared ray in a first wavelength band; generating a near-infrared camera image by a near-infrared camera that captures an image of the scene using a near-infrared ray in a second wavelength band shorter than the first wavelength band; detecting a low-level region with a predetermined level or less from the far-infrared camera image; detecting a low-level region as a transparent region based on at least the near-infrared camera image, the low-level region having the predetermined level or less resulting from being a transparent region that is a region covered with a visually transparent material, within the detected low-level region; segmenting a portion of the transparent region from the near-infrared camera image; and superimposing the portion of the transparent region onto a position of the far-infrared camera image, the position corresponding to a position of the transparent region, and generating a synthetic image.

DETAILED DESCRIPTION

A description is made below of an imaging device and infrared image generation method of at least one embodiment with reference to the accompanying drawings. As an example, a case is described, where a fire occurs in a building, and the imaging device and infrared image generation method of the embodiment are used in order to confirm a spot that has reached a high temperature.

Figure 2:
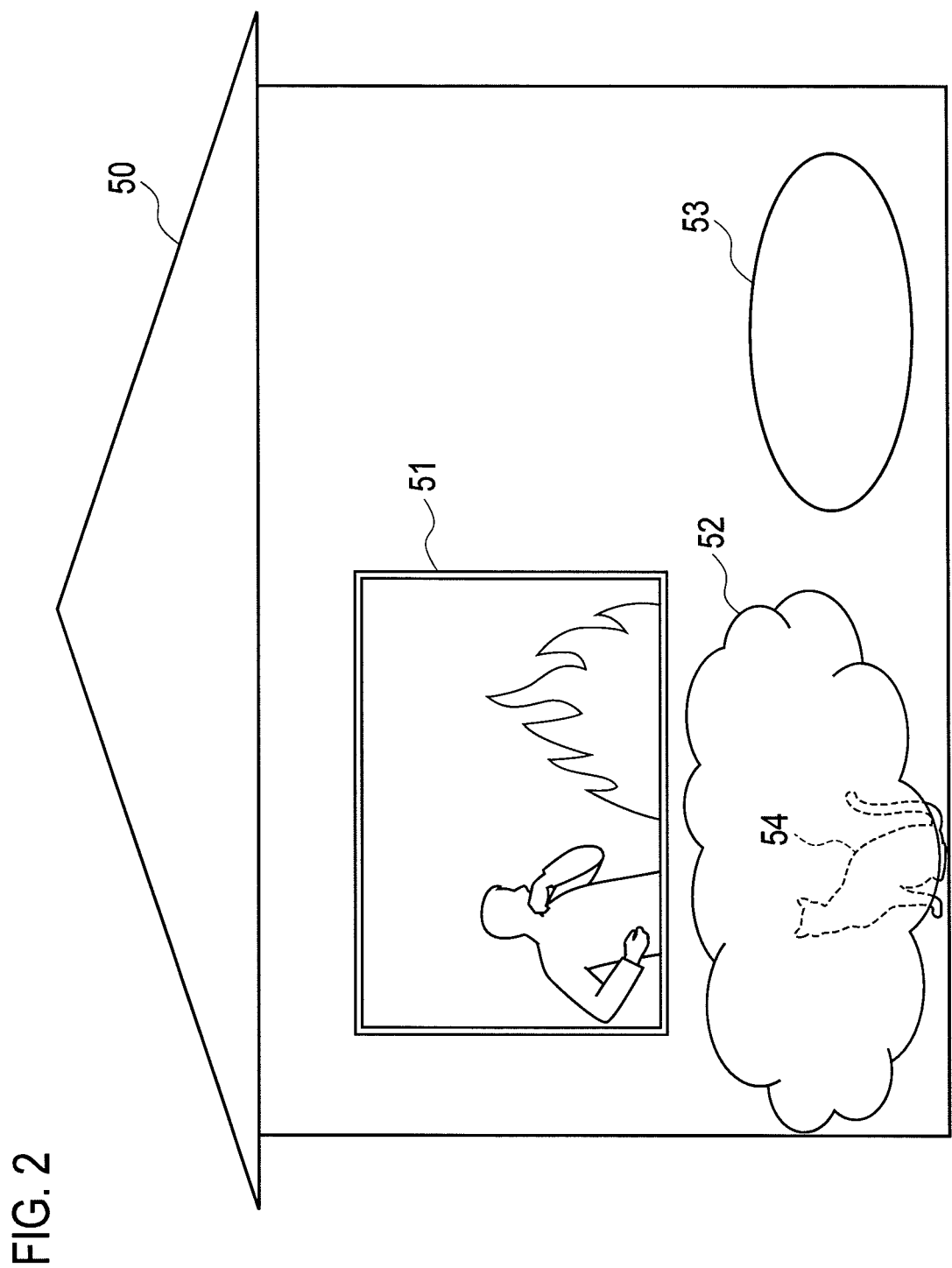
FIG. 2 is a view schematically showing an example of a scene captured by the imaging device of the embodiment.

First, by using FIG. 2, a schematic description is made of the scene of a fire, which is an example of photographic subjects captured by the imaging device. In FIG. 2, the fire is occurring in a building 50. The inside of the window 51 (that is, an interior of a room) has reached a high temperature due to flames. There is a person in the room. Smoke 52 is generated in front of the building 50. There is an animal 54, which is a heat source, inside the smoke 52. An arbitrary low-temperature object 53 is present in front of the building 50.

Figure 1:
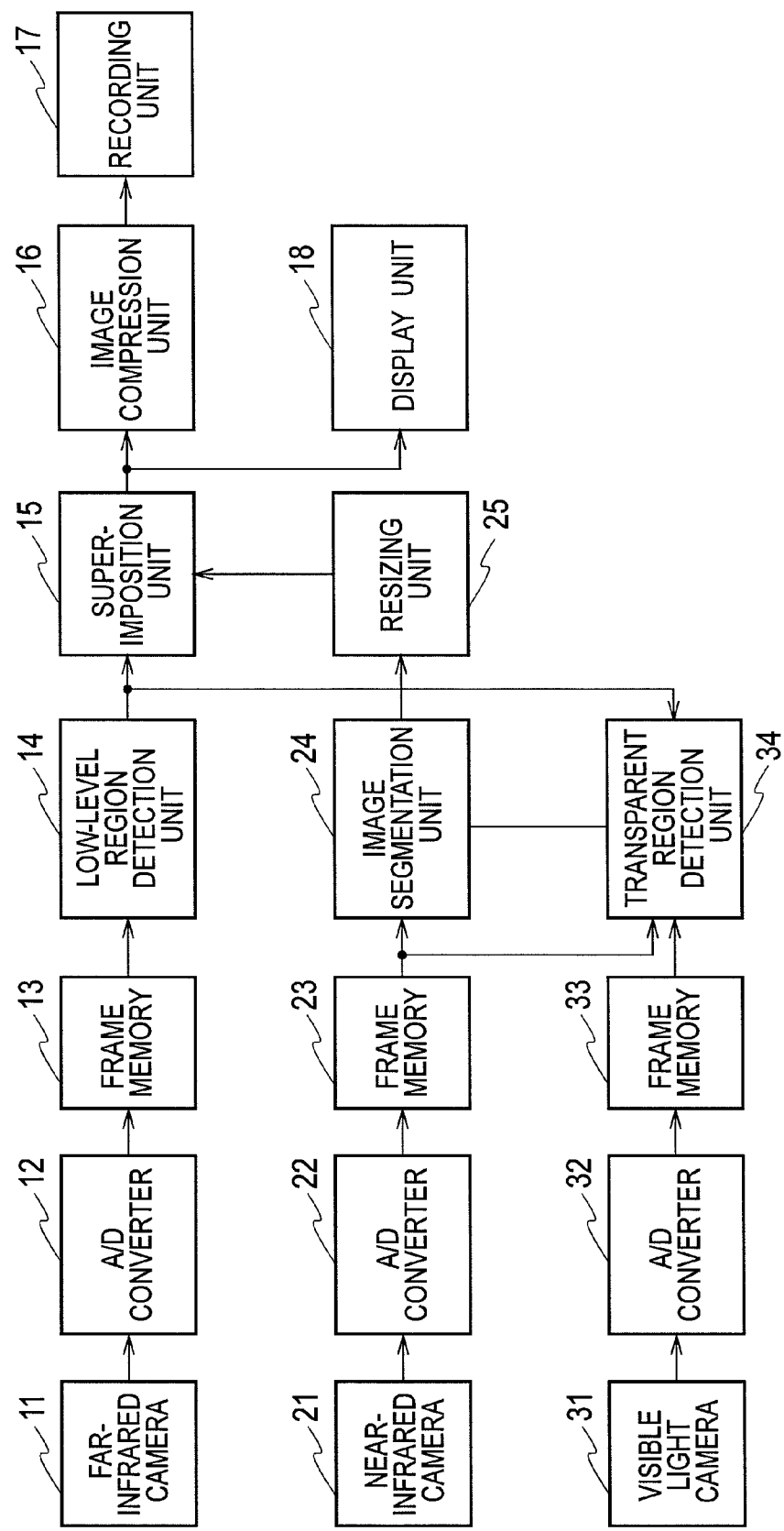
FIG. 1 is a block diagram showing an imaging device of at least one embodiment.

As shown in FIG. 1, the imaging device of the embodiments includes a far-infrared camera 11, a near-infrared camera 21 and a visible light camera 31.

In FIG. 1, the far-infrared camera 11, the near-infrared camera 21 and the visible light camera 31 are shown apart from one another, however, it is recommended to arrange at least the lens portions of the cameras close to one another. It is recommended to arrange the lens portions of the respective cameras close to one another in a triangular shape, and to achieve an approximately common camera angle and thereby view (imaged region) of the scene to be captured.

The far-infrared camera 11, the near-infrared camera 21 and the visible light camera 31 may be arranged integrally with one another in one chassis.

The far-infrared camera 11 captures an image of the scene using a far-infrared ray from the first wavelength band, and generates a far-infrared camera image. For example, the first wavelength band ranges from 4 to 1000 μm (performance of the far-infrared camera 11 covers wavelengths of 7 to 14 μm).

The near-infrared camera 21 captures an image of the scene using a near-infrared ray form the second wavelength band shorter than the first wavelength band, and generates a near-infrared camera image. For example, the second wavelength band ranges from 0.7 to 2.5 μm (performance of the near-infrared camera 21 covers wavelengths of 0.9 to 1.7 μm). The visible light camera 31 captures an image of the scene using a band of visible light, and generates a visible light camera image.

An A/D converter 12 digitizes the respective frames of the far-infrared camera image, which are outputted from the far-infrared camera 11. A frame memory 13 temporarily stores the respective digitized frames.

An A/D converter 22 digitizes the respective frames of the near-infrared camera image, which are outputted from the near-infrared camera 21. A frame memory 23 temporarily stores the respective digitized frames.

An A/D converter 32 digitizes the respective frames of the visible light camera image, which are outputted from the visible light camera 31. A frame memory 33 temporarily stores the respective digitized frames.

Figure 3:
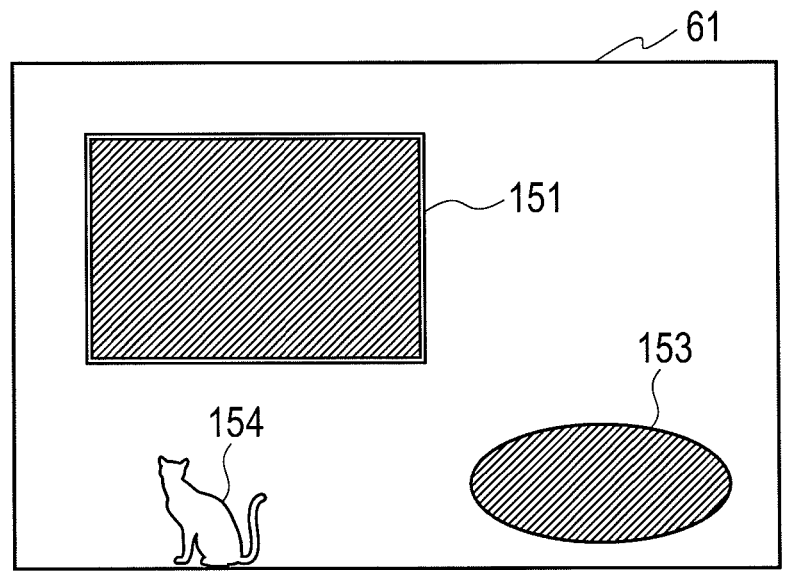
FIG. 3 is a view showing a far-infrared camera image generated in such a manner that a far-infrared camera 11 in FIG. 1 captures the scene.

FIG. 3 shows one-frame of the far-infrared camera image 61 stored in the frame memory 13 in such a manner that the far-infrared camera 11 captures an image of the scene. The far-infrared ray does not penetrate through glass of the window 51 in FIG. 2, and accordingly, a portion of the window 51 becomes a low-level region 151 with a predetermined level or less. A portion of the low-temperature object 53 also becomes a low-level region 153 in a similar way.

In the scene, the low-level region 151 is a region which has the predetermined level or less, resulting from being covered with a visually transparent material, and being a transparent region where far-infrared rays cannot penetrate. Meanwhile, the low-level region 153 is a region which has the predetermined level or less by being at a low temperature.

Since the far-infrared ray penetrates through the smoke 52, the image of the animal 54 present inside the smoke 52 is captured. Hence, the far-infrared camera image 61 includes a captured-animal image 154 by capturing the image of the animal 54. The same as above also applies to a case where a person is present in place of the animal 54. Moreover, the far-infrared ray also penetrates through water vapor, and accordingly, the same as above also applies to a case where the water vapor is present in place of the smoke 52 and the heat source such as the animal 54 is present inside the water vapor.

Figure 4:
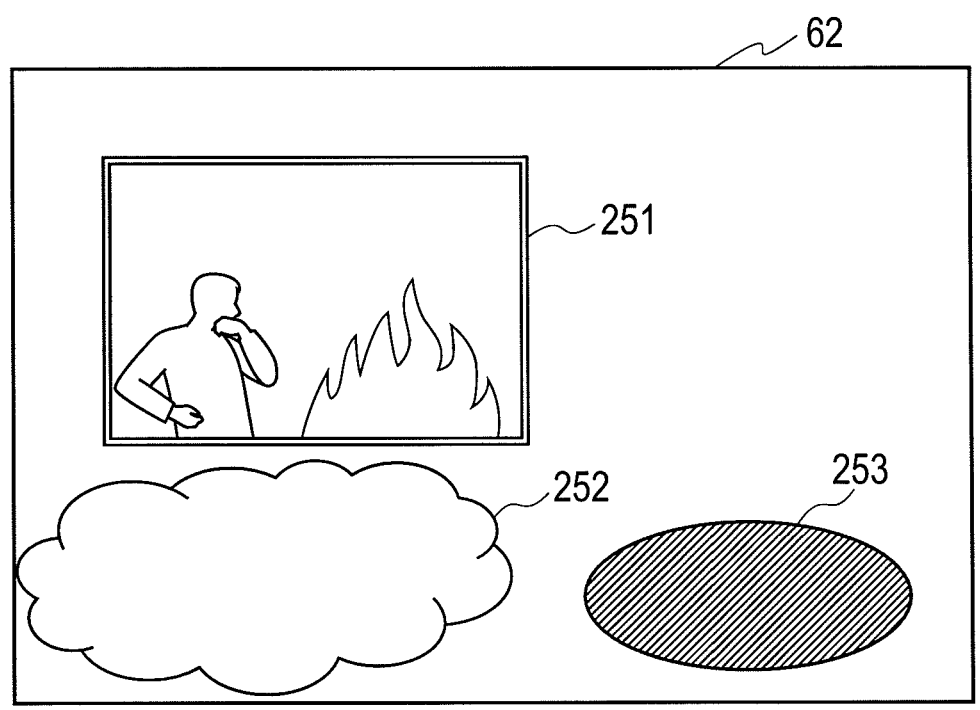
FIG. 4 is a view showing a near-infrared camera image generated in such a manner that a near-infrared camera 21 in FIG. 1 captures the scene.

FIG. 4 shows one-frame of the near-infrared camera image 62 stored in the frame memory 23 in such a manner that the near-infrared camera 21 captures an image of the scene. The near-infrared ray penetrates through the glass of the window 51 in FIG. 2, and accordingly, the portion of the window 51 becomes a captured-window image 251 with a high level. The near-infrared ray is less likely to penetrate through the smoke 52 (or the water vapor), and accordingly, the portion of the smoke 52 becomes a captured-smoke image 252 with a relatively low level. A portion of the low-temperature object 53 becomes a low-level region 253.

Figure 5:
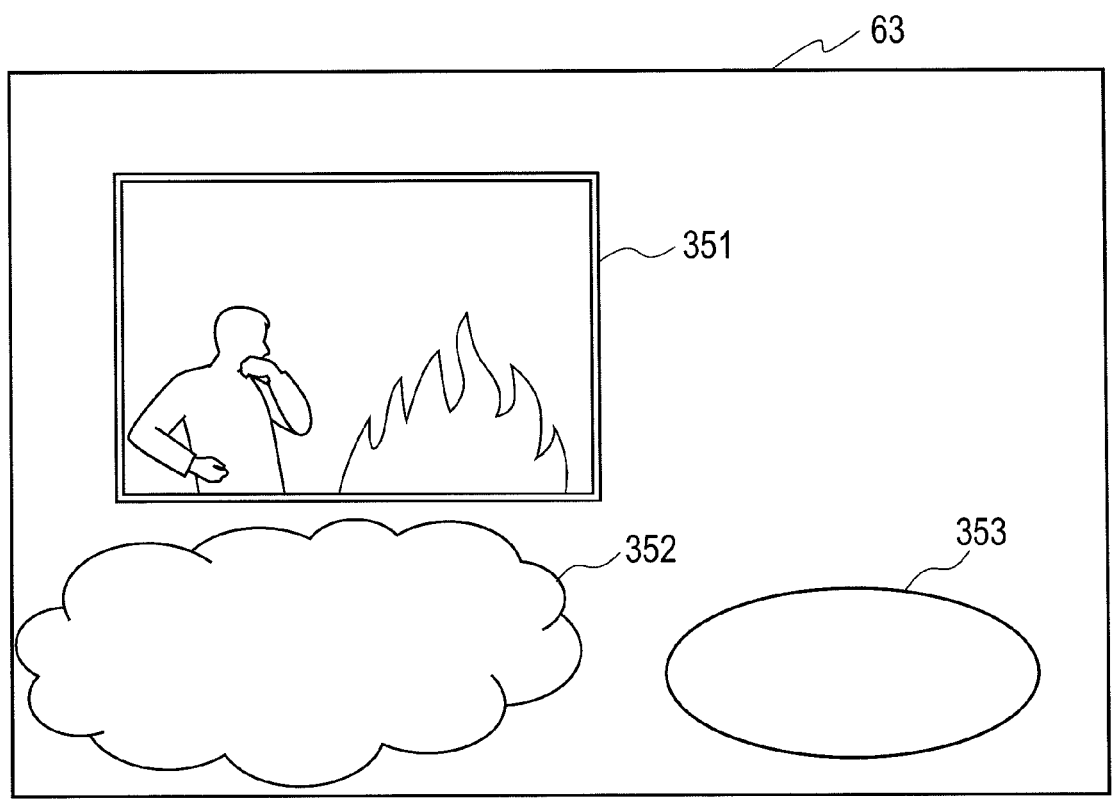
FIG. 5 is a view showing an example of a visible light camera image generated in such a manner that a visible light camera 31 in FIG. 1 captures the scene.

FIG. 5 shows a one-frame visible light camera image 63 stored in the frame memory 33 in such a manner that the visible light camera 31 captures an image of the scene. The visible light camera image 63 includes a captured-window image 351, a captured-smoke image 352 and a low-temperature captured-object image 353 capturing an image of the low-temperature object 53.

Incidentally, the number of pixels (image size) in a horizontal direction and vertical direction of the far-infrared camera image 61 is usually smaller than the number of pixels in the near-infrared camera image 62 or the visible light camera image 63. FIG. 3 to FIG. 5 illustrate examples where the image size of the far-infrared camera image 61 is the smallest and the image size of the visible light camera image 63 is the largest.

All of the image sizes of the far-infrared camera image 61, the near-infrared camera image 62 and the visible light camera image 63 may be the same, and a magnitude relationship between the image sizes is not particularly limited.

Returning to FIG. 1, a low-level region detection unit 14 detects a low-level region, which has an area equal to or greater than a predetermined area, from the far-infrared camera image 61. In the example of FIG. 3, the low-level region detection unit 14 detects the low-level regions 151 and 153. The low-level region detection unit 14 can be composed of a circuit. The far-infrared camera image 61 is inputted to a superimposition unit 15.

The low-level region detection unit 14 is not required to detect a low-level region with an area smaller than the predetermined area.

A threshold value at which the low-level region detection unit 14 detects that a region is the low-level region, is only required to be set at an appropriate value depending on type, sensitivity, number of pixels, setting state and the like of a sensor for use in the far-infrared camera image 61.

Positional information of each of the low-level regions 151 and 153, which is detected by the low-level region detection unit 14, is inputted to a transparent region detection unit 34. The near-infrared camera image 62 and the visible light camera image 63 are also inputted to the transparent region detection unit 34. The transparent region detection unit 34 can be composed of a circuit.

The transparent region detection unit 34 detects which of the low-level regions 151 and 153 is the region (transparent region) of the window 51, based on the near-infrared camera image 62 and the visible light camera image 63.

Specifically, the transparent region detection unit 34 detects the transparent region as follows: The transparent region detection unit 34 performs frequency conversion for the visible light camera image 63 by FFT (Fast Fourier Transform), DCT (Discrete Cosine Transform) or by similar processes. Based on a signal subjected to the aforementioned frequency conversion, the transparent region detection unit 34 determines that the region is the transparent region if the signal includes a high-frequency component with a reference value or greater, and determines that the region is not the transparent region if the signal does not include the high-frequency component with the reference value or greater.

If the region is determined to be the transparent region (such as the window 51), then a complex image, such as a person is present in the inside the window 51, and accordingly, the signal subjected to the frequency conversion includes the high-frequency component with the reference value or greater. On the other hand, if the low-temperature object 53 is a relatively simple image, the signal subjected to the frequency conversion does not include the high-frequency component with the reference value or greater.

Moreover, the transparent region detection unit 34 confirms the level of the near-infrared camera image 62, determines that the region is the transparent region if the confirmed level is a predetermined level or greater, and determines that the region is not the transparent region if the confirmed level is the predetermined level or greater.

The level of the captured-window image 251 shown in FIG. 4 is high, and accordingly, the transparent region detection unit 34 determines that a portion of the captured-window image 251 is a transparent region.

The transparent region detection unit 34 may detect the transparent region based on exclusively on the near-infrared camera image 62. In this case, it is possible to omit portions from the visible light camera 31 to the frame memory 33.

If the transparent region is detected based on both the near-infrared camera image 62 and the visible light camera image 63, then detection accuracy can be enhanced. Hence, it is preferable that the transparent region detection unit 34 detect the transparent region based on both the near-infrared camera image 62 and the visible light camera image 63.

Incidentally, in a case where the image sizes of the far-infrared camera image 61, the near-infrared camera image 62 and the visible light camera image 63 are different from one another, the transparent region detection unit 34 needs to detect the transparent region while considering the difference between the image sizes.

Positional information indicating the region of the window 51, which is the transparent region detected by the transparent region detection unit 34, is inputted to an image segmentation unit 24. The positional information inputted to the image segmentation unit 24 is positional information corresponding to the image size of the near-infrared camera image 62. The image segmentation unit 24 can be composed of a circuit.

Figure 6:
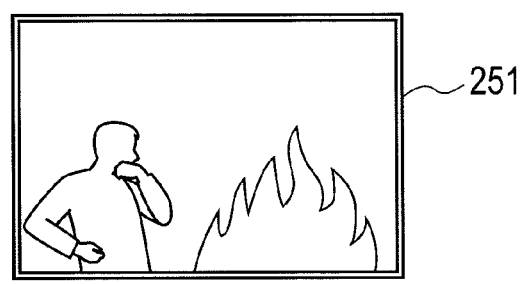
FIG. 6 is a view showing a captured-window image 251, segmented by an image segmentation unit 24 in FIG. 1.

The image segmentation unit 24 segments a portion of the captured-window image 251 from the near-infrared camera image 62, shown in FIG. 4, based on the positional information indicating the region of the window 51. FIG. 6 shows the segmented captured-window image 251. The captured-window image 251 shown in FIG. 6 is inputted to the resizing unit 25.

Figure 7:
FIG. 7 is a view showing a captured-window image 251r in which the captured-window image 251 is resized by a resizing unit 25 in FIG. 1.

The resizing unit 25 changes the image size of the captured-window image 251 so that the image size concerned can match with the image size of the far-infrared camera image 61. The resizing unit 25 can be composed of a circuit. Here, the resizing unit 25 reduces the captured-window image 251. FIG. 7 shows a captured-window image 251r obtained by resizing the captured-window image 251. The captured-window image 251r shown in FIG. 7 is inputted to the superimposition unit 15.

In a case where the image size of the far-infrared camera image 61 and the image size of the near-infrared camera image 62 are the same, it is not necessary to provide the resizing unit 25.

Figure 8:
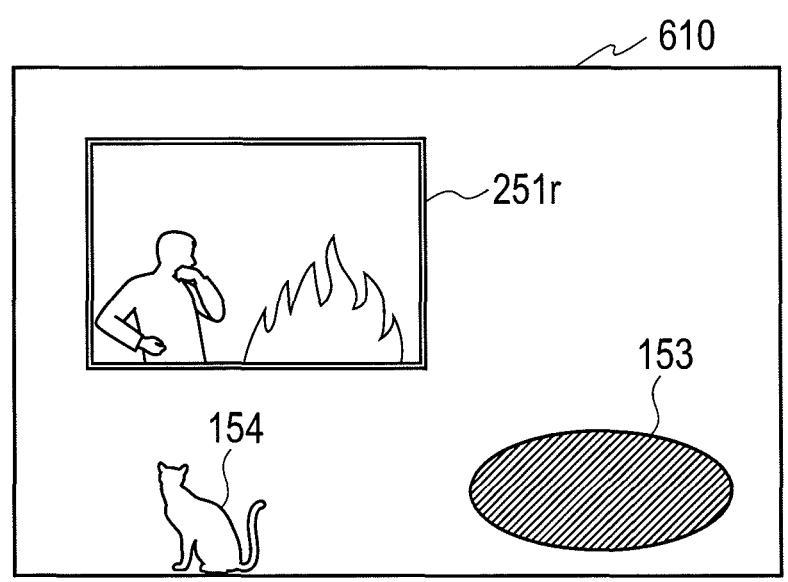
FIG. 8 is a view showing a synthetic image 610 generated by a superimposition unit 15 in FIG. 1.

The superimposition unit 15 superimposes the captured-window image 251r onto a position in the low-level region 151 of the far-infrared camera image 61 shown in FIG. 3, and generates a synthetic image 610 shown in FIG. 8. The superimposition unit 15 can be composed of a circuit. The superimposition unit 15 may completely substitute the captured-window image 251r for the low-level region 151, or may turn the captured-window image 251r into a translucent state with a predetermined transmittance, and may superimpose the captured-window image 251r onto the low-level region 151.

In accordance with the synthetic image 610 shown in FIG. 8, both portions of the inside of the window 51 and the portion obscured by the smoke 52 can be confirmed.

The synthetic image 610 is inputted to an image compression unit 16 and a display unit 18. The image compression unit 16 compresses the synthetic image 610 by an arbitrary compression method such as JPEG and MPEG. The image compression unit 16 can be composed of a circuit.

The display unit 18 displays the inputted synthetic image 610. The display unit 18 is an arbitrary display such as liquid crystal panel. The recording unit 17 records a compressed image outputted from the image compression unit 16. The recording unit 17 records the compressed image in an arbitrary recording medium, such as the semiconductor memory.

Figure 9:
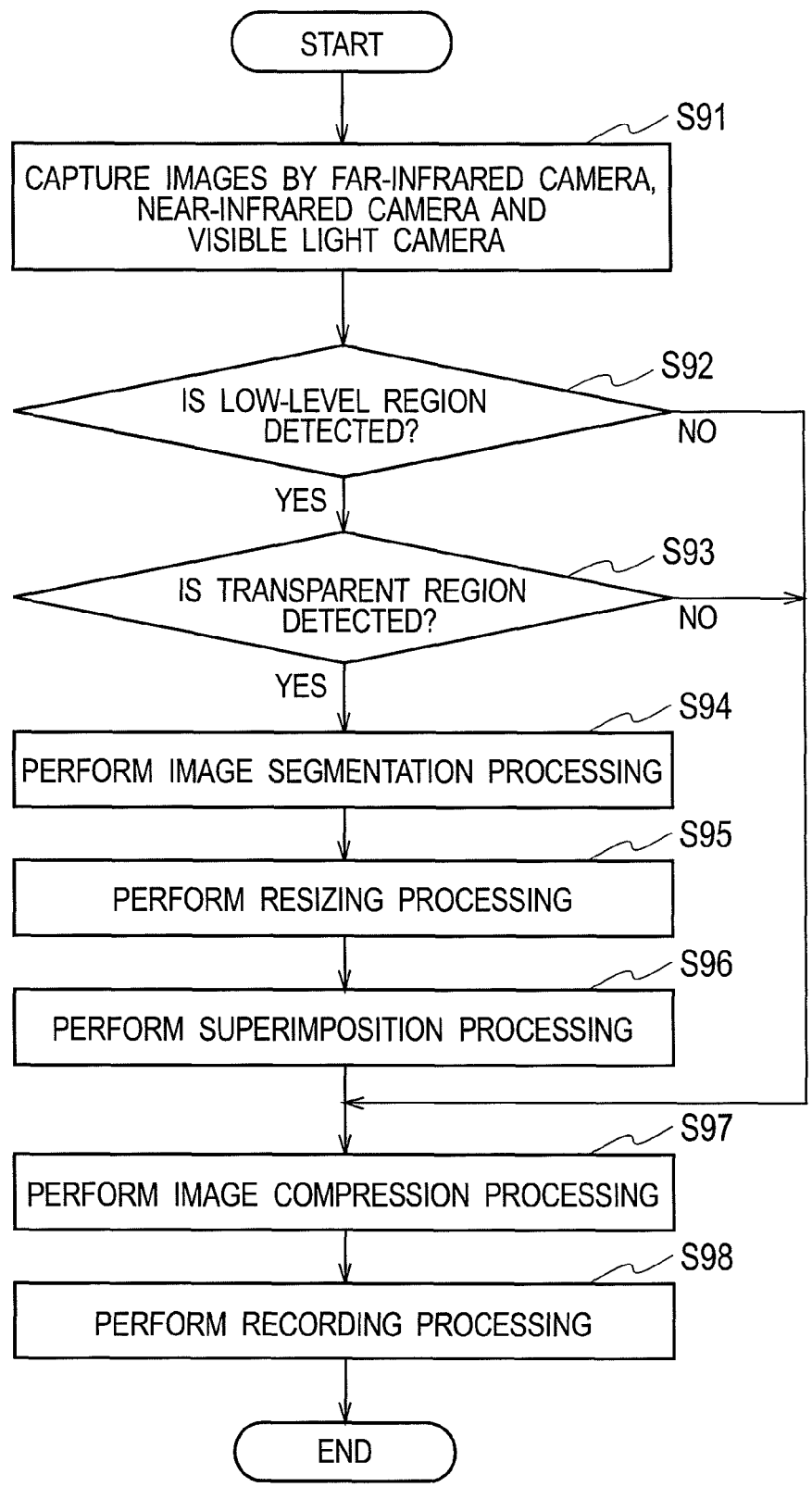
FIG. 9 is a flowchart showing operations of the imaging device of at least one embodiment.

By using the flowchart shown in FIG. 9, another description is made of such operations as the imaging device shown in FIG. 1 and the infrared image generation method executed by the imaging device. In FIG. 9, when the imaging device begins the operations, then in Step S91, the far-infrared camera 11, the near-infrared camera 21 and the visible light camera 31 individually capture images.

In Step S92, the low-level region detection unit 14 determines whether or not to have detected the low-level region based on the far-infrared camera image 61. If the low-level region detection unit 14 has detected the low-level region (YES), then in Step S93, the transparent region detection unit 34 determines whether or not to have detected the transparent region based on at least the near-infrared camera image 62.

If the transparent region detection unit 34 has detected the transparent region (YES), then in Step S94, the image segmentation unit 24 executes image segmentation processing for segmenting the captured-window image 251 from the near-infrared camera image 62, based on the positional information indicating the region of the window 51.

If the low-level region detection unit 14 has not detected the low-level region in Step S92 (NO), or if the transparent region detection unit 34 has not detected the transparent region in Step S93 (NO), the imaging device shifts processing to Step S97.

In Step S95, the resizing unit 25 executes resizing processing for matching the image size of the segmented captured-window image 251 with the image size of the far-infrared camera image 61. In Step S96, the superimposition unit 15 executes superimposition processing for superimposing the captured-window image 251r, which is obtained by resizing the captured-window image 251, onto the far-infrared camera image 61.

In Step S97, the image compression unit 16 executes image compression processing for the synthetic image 610 generated in Step S96 by the superimposition unit 15. In Step S98, the recording unit 17 records the compressed image generated in Step S97 by the image compression unit 16, and ends the processing.

Figure 10:
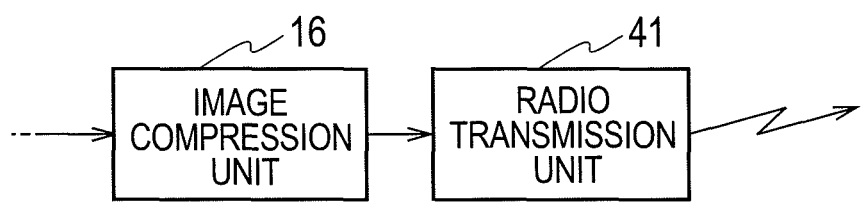
FIG. 10 is a partial block diagram showing a first modification example in which a radio transmission unit 41 is provided in place of a recording unit 17 of FIG. 1.
Figure 11:
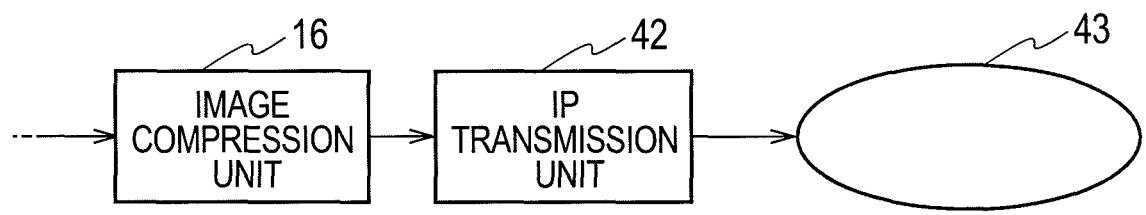
FIG. 11 is a partial block diagram showing a second modification example in which an IP transmission unit 42 is provided in place of the recording unit 17 of FIG. 1.

In FIG. 1, the recording unit 17 is provided to record the compressed image; however, configurations such as those shown in FIG. 10 and FIG. 11 may be adopted. In FIG. 10, a radio transmission unit 41 transmits a compressed image signal by radio to a radio reception unit (not shown). The radio transmission unit 41 can be composed of a circuit. In accordance with the configuration shown in FIG. 10, the synthetic image 610 shown in FIG. 8 can be confirmed at a remote location distant from the imaging device.

In FIG. 11, an IP transmission unit 42 transmits the compressed image signal to the Internet 43 in accordance with the Internet protocol. The IP transmission unit 42 can be composed of a circuit. In accordance with the configuration shown in FIG. 11, the synthetic image 610 shown in FIG. 8 can be confirmed at a remote location, which is distant from the imaging device, through the Internet 43.

In FIG. 11, an internal network (intranet) may be employed in place of the Internet 43. The type of a network is not limited.

As described above, in accordance with the imaging device and infrared image generation method of the embodiments, a situation inside of a portion where a transparent substance exists, which does not allow the penetration of far-infrared rays, can be confirmed.

The present invention is not limited to the embodiments described above, and is modifiable in various ways within the scope without departing from the scope of the present invention. It is also possible to realize the configuration, shown in FIG. 1, partially by software (computer program). Portions, in which it is possible to substitute the software for hardware, may be entirely replaced by software, or may be partially replaced thereby.

The glass of the window 51 is an example of the visually transparent material that does not penetrate the far-infrared ray therethrough. Plastic is also a visually transparent material that does not penetrate the far-infrared ray therethrough. The transparent region included in the scene is not limited to the glass.

What is claimed is:

1. An imaging device comprising:
    a far-infrared camera configured to capture an image of a scene using a far-infrared ray in a first wavelength band and generate a far-infrared camera image, the first wavelength band being included in a first range from 4 to 1000 μm;
    a near-infrared camera configured to capture an image of the scene using a near-infrared ray in a second wavelength band shorter than the first wavelength band and generate a near-infrared camera image, the second wavelength band being included in a second range from 0.7 to 2.5 μm;
    a visible light camera configured to capture an image of the scene by visible light and generate a visible light camera image;
    a low-level region detection unit configured to detect a low-level region with a level or less based on a threshold value from the far-infrared camera image;
    a transparent region detection unit configured to detect a low-level region as a transparent region based on both the near-infrared camera image and the visible light camera image taken as a portion of at least one of the near-infrared camera image and the visible light camera image, the low-level region having the level or less resulting from being a transparent region that is a region covered with a visually transparent material, within the low-level region detected by the low-level region detection unit;
    an image segmentation unit configured to segment a portion of the transparent region from the near-infrared camera image; and
    a superimposition unit configured to superimpose the portion of the transparent region onto a position of the far-infrared camera image, the position corresponding to a position of the transparent region, and generate a synthetic image,
    wherein the transparent region detection unit converts frequency of a signal of the visible light camera image, and determines that the low-level region is a transparent region, when a level of the near-infrared camera image is a predetermined level or greater, and when the frequency-converted signal of the visible light camera image includes a high frequency component with a reference value or greater.

2. The imaging device according to claim 1, wherein an image size of the far-infrared camera image and an image size of the near-infrared camera image are different from each other, and the imaging device further comprises:
    a resizing unit configured to change an image size of the portion of the transparent region, the portion being segmented by the image segmentation unit, so that the image size corresponds to the image size of the far-infrared camera image.

3. An infrared image generation method comprising:
    generating a far-infrared camera image by a far-infrared camera that captures an image of a scene using a far-infrared ray in a first wavelength band, the first wavelength band being included in a first range from 4 to 1000 μm;
    generating a near-infrared camera image by a near-infrared camera that captures an image of the scene using a near-infrared ray in a second wavelength band shorter than the first wavelength band, the second wavelength band being included in a second range from 0.7 to 2.5 μm;
    generating a visible light camera image by a visible light camera that captures an image of the scene by visible light;
    detecting a low-level region with a level or less based on a threshold value from the far-infrared camera image;
    determining whether a level of the near-infrared camera image is a predetermined level or greater;
    converting frequency of a signal of the visible light camera image;
    determining whether the frequency-converted visible light camera image includes a high frequency component with a reference value or greater;
    determining that a transparent region is a low-level region, the low-level region having the predetermined level or less resulting from being a region covered with a visually transparent material, within the detected low-level region, when a level of the near-infrared camera image is the predetermined level or greater, and when the frequency-converted signal of the visible light camera image includes a high frequency component with the reference value or greater;
    segmenting a portion of the transparent region from the near-infrared camera image taken as a portion of the near-infrared camera image; and
    superimposing the portion of the transparent region onto a position of the far-infrared camera image, the position corresponding to a position of the transparent region, and generating a synthetic image.

4. The imaging device according to claim 1, wherein the first wavelength band is included in a third range from 7 to 14 μm, and the second wavelength band is included in a fourth range from 0.9 to 1.7 μm.

5. The infrared image generation method according to claim 3, wherein the first wavelength band is included in a third range from 7 to 14 μm, and the second wavelength band is included in a fourth range from 0.9 to 1.7 μm.

* * * * *